May 26, 1953 E. B. FERNBERG 2,639,764
CAR SEAT FABRIC CLIP
Filed March 14, 1950

Inventor
Eric B. Fernberg
by Malcolm W. Fraser
attorney

Patented May 26, 1953

2,639,764

UNITED STATES PATENT OFFICE 2,639,764

CAR SEAT FABRIC CLIP

Eric Birger Fernberg, Pinner, England

Application March 14, 1950, Serial No. 149,604
In Great Britain March 9, 1949

3 Claims. (Cl. 155—180)

The present invention relates to an improved method and means of fastening a sheet of flexible material to a rigid member, and although not exclusively limited thereto, is particularly useful for securing the fabric covering of an automobile seat to the seat frame.

It is known practice at the present time to construct an automobile seat of a rigid frame over which is lapped and strained a sheet of flexible material such as Rexine or fabric, the edges of the flexible material being tacked, hooked or riveted to an appropriate member of the frame.

It is an object of the present invention to provide improved means for attaching flexible material to the frame of an automobile seat.

Another object is to provide improved means for securing fabric covering to furniture such as a sofa, a box mattress, or a divan.

Another object is to provide a method and means for attaching fabric covering to furniture in such a way that the effect of uneven straining of the fabric, such as wrinkling, is concealed.

Figure 1:
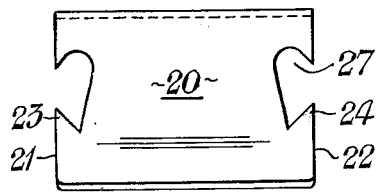
Figure 2:
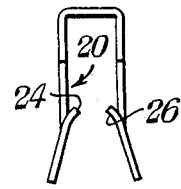
Figure 3:
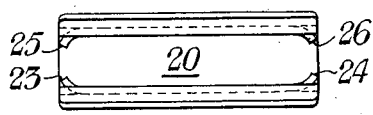
Figure 4:
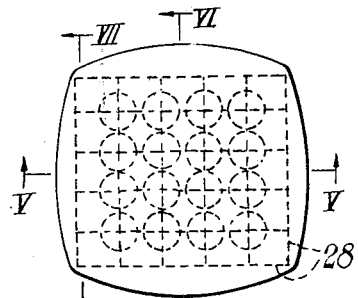
Figure 6:
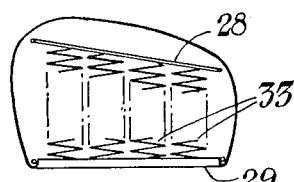
Figure 5:
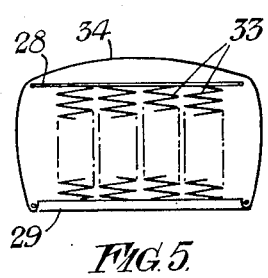
Figure 7:
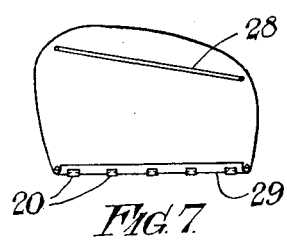
Figure 8:
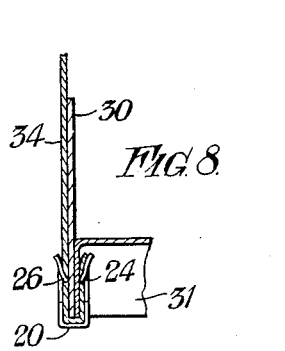
Figure 9:
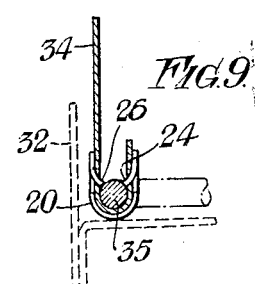
Figure 10:
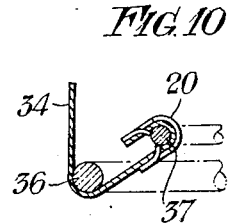

Preferred forms of the invention will now be described with reference to the accompanying diagrammatic figures, in which Figures 1, 2 and 3 are respectively a front and side elevation and underplan of a clip, Figure 4 is a plan of an automobile loose seat, Figures 5, 6 and 7 are respectively sections on the lines V—V, VI—VI and VII—VII of Figure 4, Figure 8 shows a detail of the seat shown in Figures 4 to 7, whilst Figures 9 and 10 illustrate modifications of the seat assembly shown in the previous figures.

In Figures 1 to 3 is shown a clip indicated generally at 20, preferably formed from a single rectangular strip of spring metal out of each of the longer edges 21 and 22 of which are sheared and bent a pair of prongs 23 and 24 or 25 and 26. A small area of metal such as 27 around the tip of each prong may be cut away before the respective prong is bent out of the general plane of the strip, or each prong may be formed more simply by shearing an oblique slit into the edge (such as 21) of the metal and then bending the tip of the prong out of the plane of the strip.

In either case the tips of the prongs are directed towards the transverse median line of the strip, and the strip is then bent to the U-shape shown in Figure 2 so that the prongs are then directed inwardly and rearwardly towards the base or web of the U.

If desired, however, one or more of the prongs may be sheared and bent out of an internal portion of the strip, i. e., not out of an edge of the strip.

Figures 4 to 7 illustrate a loose seat for an automobile. The seat comprises an upper rectangular member 28 and a lower rectangular member 29 each of which encloses wire mesh, whilst between the two layers of wire mesh are secured springs 33. Around the frame members is lapped a sheet of flexible material 34 such as Rexine or fabric and between the frame and flexible material is positioned suitable padding material not shown.

The lower frame member 29 consists, as shown in Figure 8, of a flat strip of metal 30 bent to rectangular shape and to which is welded a reinforcing strip of angle metal 31.

In order to secure an edge of the flexible material 34 to the frame members 30, 31 (Figure 8) an edge of the flexible material is folded over the contacting lower edges of the members 30, 31 and thereafter several of the clips 20 are forced over the frame members so that the prongs 26, 24 pass through the flexible material and bite into the metal frame members.

Thereafter the flexible material is pulled upwardly over the padding, around the frame of the seat, and the other end is secured in a similar manner to the appropriate frame member.

All four edges of the flexible material are attached to the lower frame member 29 in this way by fasteners 20 which, as shown in Figure 7, are spaced at intervals around this frame member.

Figure 9 is a view similar to that of Figure 8 but showing a frame member 35 of circular section. As before, the flexible material 34 is lapped around the rod-like frame member 35 and thereafter a series of clips 20 are forced transversely over the frame member so that the prongs of the clip pass through the flexible material 34 and engage the frame member 35. It will be seen that the prongs 26 and 24 pass over the diameter of the section of the frame member to hold the fabric very securely to the frame member.

Usually the seat is dropped into a seat box (32, Figure 9) having an upstanding edge which hides the clips.

Figure 10 is a view similar to Figures 8 and 9 but in which the frame consists of two parallel, adjacent rod-like members 36 and 37 braced together at intervals along their lengths. The flexible material 34 is lapped around the larger rod-like member 36, then around the smaller member 37 and is then strained and secured to this member with the aid of a series of fasteners 20. This construction has the advantage over those described previously that the straining of the flexible material is evened out at the member 36 and therefore does not show; any wrinkles being hidden.

Any clip which is of U-shape and is formed with at least one internally and rearwardly directed prong may be used to secure the flexible material to the rigid member and such clips may be used to secure any flexible material to any rigid material.

I claim:

1. A fastener for securing flexible sheet upholstery material to a rigid rod comprising a one-piece relatively thin body of spring metal generally U-shaped in cross section, and a pair of prongs on each arm of the U-shaped body arranged opposite to each other, there being a cut-out on opposite side edges of the body shaped to form a pair of prongs, said body being adapted to be sprung about the rod and the prongs impinge against the rod.

2. A fastener for securing flexible sheet upholstery material to a rigid frame member comprising a one-piece relatively thin body of spring metal generally U-shaped in cross section, adapted to be sprung embracingly over the rigid frame member, and an integral relatively short stiff prong on one of the arms of the U extending internally of the body and rearwardly in the direction of the web of the U to puncture the upholstery material, said prong being spaced from the web a sufficient distance so that in applied position, it extends through the upholstery material and into biting engagement with the frame member.

3. A fastener for securing flexible sheet upholstery material to a rigid frame member comprising a one-piece relatively thin body of spring metal generally U-shaped in cross section, adapted to be embracingly sprung over the rigid frame member, and an integral relatively short stiff prong on one of the arms of the U extending internally of the body and rearwardly in the direction of the web of the U to puncture the upholstery material, the point of the prong being formed by a cut-out along the edges of the body member.

ERIC BIRGER FERNBERG.

References Cited in the file of this patent

UNITED STATES PATENTS

| Number | Name | Date |
|---|---|---|
| 810,004 | Tabler | Jan. 16, 1906 |
| 1,281,440 | Vinette | Oct. 15, 1918 |
| 1,291,773 | D'Arcy | Jan. 21, 1919 |
| 1,455,754 | Trimble | May 15, 1923 |
| 1,507,026 | McKoun | Sept. 2, 1924 |
| 1,544,872 | Trimble | July 7, 1925 |
| 2,096,822 | Oldman | Oct. 26, 1937 |
| 2,574,330 | Judd | Nov. 6, 1951 |